United States Patent Office 3,027,391
Patented Mar. 27, 1962

3,027,391
METAL PHTHALOCYANINES
Norman A. Frigerio, Willow Springs, Ill., assignor to the United States of America as represented by the United States Atomic Energy Commission
No Drawing. Filed Aug. 28, 1959, Ser. No. 836,834
36 Claims. (Cl. 260—429.1)

This invention deals with a method of producing metal phthalocyanines and with some of the compounds obtained by this new method. This application is particularly concerned with the preparation of actinide and lanthanide rare earth phthalocyanines and, among others, with the production of uranyl phthalocyanines. This application furthermore deals with a number of novel processes using the compounds of this invention.

Phthalocyanine is an organic ring compound condensed from four isoindole nuclei. It has the formula

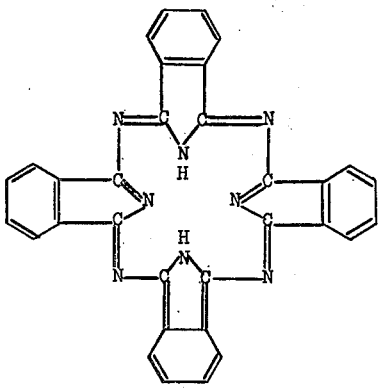

This compound with the two nitrogen-bonded hydrogen atoms in the "center" is water-insoluble; the sulfonated compound, however, is water-soluble, the degree of water-solubility depending on the number of sulfo groups in the benzene rings of each molecule. By reaction with a metal salt, the phthalocyanine can be converted to the corresponding metal phthalocyanine wherein the nitrogen-bonded hydrogen atoms are replaced by the metal cation. If this metal cation is bivalent, one atom is held by both of the nitrogen atoms the hydrogen of which has been replaced. The same is true in the case of a bivalent radical, for instance the uranyl cation. The formula of the uranyl phthalocyanine is

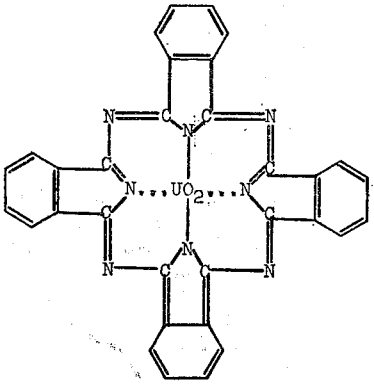

For the formation of lanthanide and actinide phthalocyanines, all reagents must be anhydrous, so that no reconversion to the phthalocyanine can take place. Even traces of ionized hydrogen would have this effect. This creates a problem in the production of the metal phthalocyanines, because it is extremely difficult to obtain the salts in completely anhydrous form and because there are no practical methods of quantitative dehydration.

I have devised two new methods, one for the preparation of the metal phthalocyanines and one for the preparation of the sulfonated metal phthalocyanines. These methods will now be illustrated as applied to the production of the uranyl compounds.

The water-insoluble uranyl phthalocyanine is prepared, according to this invention, via anhydrous auranyl complex salts. These salts are made by reacting an inorganic uranyl salt, such as uranyl nitrate hexahydrate or uranyl chloride, with a Lewis-base-type nitrogen- or sulfur-containing organic compound, preferably a compound that is liquid at room temperature; for instance, dimethyl formamide (DMF), $HCON(CH_3)_2$, or methyl sulfoxide are suitable compounds. This type of reaction takes place according to the following equation:

$$UO_2(NO_3)_2 \cdot 6H_2O + 2DMF \rightarrow UO_2(NO_3)_2 \cdot 2DMF + 6H_2O.$$

In this reaction a water-free complex is formed between the uranyl salt and the organic compound. The uranyl salt is preferably added in a quantity to obtain saturation of the organic liquid, because then the uranyl complex salt will crystallize out of the solution, which makes its isolation comparatively simple. This uranyl complex is then separated from the liquid and mixed with an about stoichiometric quantity of lithium phthalocyanine ($Li_2Pc$) at room temperature under anhydrous conditions, whereby the uranyl salt is obtained according to the following equation:

$$Li_2Pc + UO_2(NO_3)_2 \cdot 2DMF \rightarrow UO_2Pc + 2LiNO_3 + 2DMF$$

(If the lithium phthalocyanine had been reacted simply with uranyl nitrate hexahydrate, the water would have decomposed the lithium phthalocyanine so that pure uranyl phthalocyanine would not have been obtained in this process.) The uranyl phthalocyanine is isolated from the reaction mixture as a crystalline precipitate. Metal phthalocyanines of sodium, potassium, magnesium or beryllium can also be used, instead of the lithium phthalocyanine, for synthesizing the uranyl phthalocyanine by the method just described.

In the following an example is given which illustrates in detail the preparation of uranyl phthalocyanine.

*Example 1*

10.04 gm. of uranyl nitrate hexahydrate were dissolved in 8.8 gm. of boiling anhydrous dimethyl formamide, and the reaction mixture was then cooled on an ice bath to 0° C. Yellow crystals precipitated; they were filtered off, washed in anhydrous diethyl ether at 0° C. and dried at about 200° C. 9.2 gm. of the uranyl nitrate-dimethyl formamide complex were thus obtained, which corresponds to a yield of 85%. The complex had a melting point of 178° C. Analysis showed a uranium content of 44.02% (theoretical uranium content: 44.07%).

5.26 gm. of lithium phthalocyanine were then dissolved in 40 ml. of anhydrous dimethyl formamide at 25° C., and 5.40 gm. of the uranyl nitrate-dimethyl formamide complex were dissolved also in 40 ml. of anhydrous dimethyl formamide at 25° C. This latter solution was slowly stirred into the lithium phthalocyanine solution whereby a heavy deep-blue precipitate formed. This precipitate was separated by filtration, washed with boiling dimethyl formamide followed by diethyl ether and then dried. The yield of uranyl phthalocyanine was 7.8 gm. which is 100%. The uranium content of the product was ascertained as 30.38% (theoretical: 30.42%).

In order to prepare the water-soluble sulfonated salt, a mixture of an inorganic uranyl salt and a sulfonated phthalocyanine is boiled in water. The sulfonation of the phthalocyanine can be carried out by any method known to those skilled in the art; it is not part of the invention. The uranyl salt is added in an amount considerably above that stoichiometrically required. While a stoichiometric amount of uranyl ion replaces the nitrogen-bonded hydrogen in the ring of the sulfonated phthalocyanine, any excess present reacts with the hydrogen atoms of the sulfo groups; for instance, in case the phthalocyanine used has four sulfo groups and at least three molecules of uranyl salt are used per one molecule of sulfonated phthalocyanine, two uranyl cations will enter the sulfo groups by replacing the hydrogens thereof, one uranyl ion each bonding with two sulfo groups, so that the final uranyl compound formed contains a total of three uranyl groups per molecule. This triuranyl complex is water-insoluble and precipitates; it can be isolated by filtration or the like. The phthalocyanine complex containing the three uranyl ions is toxic, because two of the uranyl groups are in a highly reactive, weakly bonded position.

The triuranyl complex, which was merely formed because it is insoluble and thus can be isolated easily, is then converted to the monouranyl complex which contains only the uranyl radical in the center nitrogen-bonded position. This can be accomplished by reacting the triuranyl sulfonated phthalocyanine with hydrogen sulfide or with a strong base, such as sodium hydroxide or potassium hydroxide. However, the preferred way of forming the monouranyl complex from the triuranyl phthalocyanine comprises this solution of the latter in ammonia or hydrochloric acid and then contacting the solution formed with an anion exchange resin in its sodium form. By this, the two weakly bonded uranyl ions in the sulfo groups are exchanged for the sodium ions of the resin and the water-soluble sodium salt of the sulfonated monouranyl compound is obtained as effluent, while the two uranyl ions released are taken up by the resin.

Example II illustrates the preparation of the water-soluble uranyl sulfonated phthalocyanine.

*Example II*

Sulfonated phthalocyanine, 8.38 gm., was dissolved in 250 ml. of boiling water, and 42 gm. of uranyl sulfate, $UO_2SO_4.3H_2O$, were added to the solution formed. The mixture was refluxed for three hours, whereby a precipitate formed. This precipitate was then filtered off and suspended in 250 ml. of water. Hydrogen sulfide was passed through the suspension formed for three hours whereupon the mixture was refluxed for one hour. The black precipitate that had formed during this reaction was filtered off, and the deep-blue filtrate was evaporated to dryness. A quantity of 7.3 gm. uranyl sulfonated phthalocyanine (yield of 67%) was obtained. The compound was found to contain 21.46% of uranium (theoretical: 21.51%).

All phthalocyanine compounds prepared by the methods of this invention can be purified by dissolving in boiling water and recrystallization.

Example III describes an alternative method illustrated on the preparation of the ammonium salt of uranyl sulfonated phthalocyanine.

*Example III*

To a solution of 9.1 gm. of tetra-chlorosulfonyl-substituted phthalocyanine, $H_2Pc(SO_2Cl)_4$, in 100 ml. of dimethyl formamide there were added 42 gm. of the uranyl sulfate-dimethyl formaldehyde complex $$UO_2SO_4.2DMF$$

which had been prepared by a method analogous to that used in Example I for the preparation of the uranyl nitrate complex. The mixture was refluxed for three hours and then cooled to 0° C. whereby deep-blue crystals of tetrachlorosulfonyl-substituted uranyl phthalocyanine, $UO_2Pc(SO_2Cl)_4$, precipitated. The crystals were washed with water until ferrocyanide did not show a uranyl reaction. Thereafter the crystals were refluxed in a 10% aqueous ammonia solution until evolution of ammonia had ceased. The crystals were then dissolved in boiling water and recrystallized. The result was 8.6 gms. of $UO_2Pc(SO_3NH_4)_4$, which is 73% of the theoretical yield. The uranium content of the salt was found to be 20.29% (theoretical: 20.33%).

Other salts of the tetrasulfonic-substituted uranyl phthalocyanine can be prepared from the ammonium salt by adding a stoichiometric quantity of a nonvolatile strong base and boiling the mixture for ammonia volatilization.

The monouranyl phthalocyanine, sulfonated or nonsulfonated, containing fissionable uranium isotopes, is chemically nontoxic. The uranyl radical is bonded in the molecule so strongly that its dissociation cannot even be detected analytically. This is in contradistinction to chelating compounds where the metals are comparatively loosely bonded and dissociation is detectable. This nontoxicity is a highly important feature as will be described in detail later.

The nontoxicity of the tetrasulfonic-substituted uranyl phthalocyanine is obvious from the following experiment: Eight male and eight female mice, of 25 gms. body weight, were injected intravenously on each of five successive days with 0.5 ml. of a 5% aqueous solution of the sodium salt of uranyl phthalocyanine tetrasulfonate. After 19 months no ill effects were observed on the mice or on their offspring.

The nonsulfonated uranyl phthalocyanine is water-insoluble, as has been stated before; it is soluble in concentrated sulfuric acid with some decomposition and slightly soluble in quinoline, chloronaphthalene, molten phthalonitrile or terphenyl. All the phthalocyanines and sulfonated phthalocyanines have a deep-blue color. If the uranyl phthalocyanine contains chlorine-substituted benzene rings, it has a deep-green color. At temperatures above 350° C. the metal phthalocyanines decompose in vacuum and phthalocyanine sublimes.

The methods described have also been used for the preparation of metal phthalocyanines other than the uranyl salt; thus, the phthalocyanines of lead, thorium, lanthanum, neodymium, gadolinium, dysprosium, samarium, holmium, erbium, europium, thulium, lutetium, ytterbium and hafnium have been prepared by the method described above. In these cases, except in the case of lead, insoluble salts are not formed by substitution in the sulfo groups so that the process is simplified.

As to the structure of the metal phthalocyanines of this invention, it has been set forth above that in the case of monovalent metals, metal ions simply take the place of the nitrogen-bonded center hydrogen atoms, while in the case of bivalent metals or radicals one bivalent ion is bonded by the two center nitrogen atoms which carry the hydrogen. If the phthalocyanine is reacted with a salt of a trivalent metal, two of the valences of the metal will be bonded by the two center nitrogens, while the third valence will hold one acid anion of the metal salt from which the complex was formed. Thus, if a lanthanide rare earth phthalocyanine is prepared by the reaction of hydrogen, lithium or sodium phthalocyanine with rare earth metal nitrate, the rare earth phthalocyanine obtained has a nitrate anion attached to the rare earth bonded in the center of the molecule. Conversely, if the rare earth salt was a chloride, a chloride anion will be attached to the rare earth atom. In the phthalocyanine complex of a tetravalent metal, for instance, in the thorium compound, two anion equivalents are attached to the metal.

There are a great many uses for the metal phthalocyanines of this invention. The water-insoluble compounds as well as the sulfonated water-soluble compounds in which the metal can be either a radioactive nuclide such as cobalt[60], copper[64], europium[152], gallium[72], indium[194], holmium[166], lanthanum[140] and gold[198], a fissionable nuclide such as uranium[233] or uranium[235], or a slowneutron-activatable nuclide such as samarium$^{152}$, gadolinium$^{155}$ and $^{157}$, ytterbium$^{168}$, silver$^{109}$, samarium$^{149}$, indium$^{115}$, gold$^{197}$ and europium$^{151}$, are suitable for the study of the treatment of a locatable tumor in laboratory animals, such as mice, in the preparatory study of the behavior of cancer cells. For this purpose a liquid medium containing the compound is directly injected into the tumor of the animal. A colloidal suspension of the insoluble metal compound is preferred to the sulfonated compound. The compounds having a radioactive nuclide are self-sufficient, since the radiation will destroy the tumor. For the other two groups of compounds containing the fissionable or the neutron-activatable nuclide, bombardment with slow neutrons is necessary to produce radiation. The highest energy is obtained with uranyl compounds of the fissionable isotopes, because then not only gamma rays but also fission fragments of high energy levels are obtained.

The sulfonated water-soluble compounds can also be intravenously injected in the case of a brain tumor in the aforesaid laboratory animals. Here again for destruction of the tumor tissue of the animal brain the compounds of radioactive, fissionable or neutron-activatable nuclides can be used, and the procedure as to neutron bombardment is the same as described above for the local injection of the slurry.

It was found that healthy brain tissue of said laboratory animals rejects the sulfonated metal phthalocyanine, while the tumor tissue retains it. Within minutes the ratio of concentration of the metal compound in healthy tissue and tumor tissue approximates 1:50. In the case of either fissionable or activatable nuclides the surrounding tissue, after injection, is shielded and the exposed tumor tissue is then bombarded with neutrons. This neutron bombardment is relatively harmless to any tissue other than the tumor tissue, because little metal phthalocyanine is located in the surrounding tissue. This preferential concentration of the metal phthalocyanines in the brain tumor tissue of said animals affords a considerable advantage over the use of lithium$^6$ and boron$^{10}$ compounds that have been previously employed and which are not very well concentrated in tissues of brain tumors.

Applicant states that the compounds are valuable, as indicated, for a study of the behavior of cancer cells on laboratory test animals.

The following example illustrates the application of sulfonated uranyl (U$^{235}$) phthalocyanine to mice afflicted with brain tumors.

*Example IV*

Brain tumors were transplanted into eight young mice, averaging a body weight of 25 gms., and seven days after transplant each of the mice was found to have the large cranial protrusions characteristic of this tumor. Four of these mice were selected at random and injected intraveneously with 0.40 ml. of a 5% aqueous solution of sulfonated uranyl (U$^{235}$) phthalocyanine. The protrusions were then exposed to a beam of slow neutrons for 4000 secs. at a flux of $2.5 \times 10^8$ n/cm.$^2$/sec. Three of these treated mice were still alive 30 days after transplant, and their cranial protrusions had regressed markedly, while the four untreated animals died from the tumor within 11 days.

A slurry containing a metal phthalocyanine, or a solution containing the sulfonated or carboxylated compound, of a fissionable metal such as uranium$^{233}$, uranium$^{235}$ and plutonium$^{239}$, can be used as fuel in a semi-homogeneous and homogeneous reactor, respectively. In the fission process, the fission products are completely detached from the phthalocyanine molecule. A commercial dialyzer having a suitable membrane is arranged in the so-called loop in which the fuel cycles. The fission products pass through the membrane, but the large molecules of uranyl phthalocyanine do not; thus, a separation of fission products and regeneration of the fuel are continuously accomplished without interruption of the reactor operation.

The use of a slurry is possible only if the particle size of the solid is not too great, say, not greater than from 8 to 40 microns, the maximum size permissible being dependent upon the density of the material. The fission products formed recoil out of the molecule or particles and form soluble ions.

A solution of thorium$^{232}$ or uranium$^{238}$ phthalocyanine can also be used as blanket material in neutronic breeder reactors. Neutron bombardment in this instance results in the recoil of the activated nuclides thorium$^{233}$ and uranium$^{239}$, respectively. The solution is promptly passed through a dialyzer before it reacts with neutrons to a substantial degree; the thorium$^{233}$ or uranium$^{239}$ released from the phthalocyanine complex passes through the membrane, while the unreacted large thorium or uranyl phthalocyanine molecule does not. The thorium$^{233}$ then decays to uranium$^{233}$ via protactinium$^{233}$ or the uranium$^{239}$ decays to plutonium$^{239}$ via neptunium$^{239}$. This process makes an increased yield of fissionable material possible, because the thorium$^{233}$ or uranium$^{239}$ is withdrawn from and cannot react with neutrons whereby undesirable non-fissionable isotopes would be formed, part of the breeder material would not serve its purpose and neutrons would be wasted. For the breeder material a slurry cannot be used, because the energy released in the blanket is not sufficient to break up the particles.

In the following, an example is given to illustrate the use of a uranyl sulfonated phthalocyanine solution for neutron bombardment and the separation of the non-reacted uranyl compound from neptunium$^{239}$ formed by dialysis.

*Example V*

10 ml. of a 0.001 M solution of uranyl sulfonated phthalocyanine in water were exposed for 10,000 seconds to slow neutrons in the Argonne Heavy-Water Experimental Reactor, CP–5. The neutron flux was $2.5 \times 10^8$ n/cm.$^2$/sec. After neutron bombardment the solution was placed in a cellulose sac and dialyzed against 1 liter of water ("dialysis volume") for three hours. At the end of this period, the contents of the sac and of the dialysis volume were each counted on a 256-channel gamma spectrometer. As judged by the spectra of the 2.3-day activity, over 98% of the neptunium$^{239}$ were in the dialysis volume, while less than 2% of the natural uranium had been lost from the dialysis sac. This result was confirmed by chemical analysis for the uranium in both, solution in sac and dialysis volume.

Another utility of the phthalocyanine compounds pertaining to the reactor field is that for the disposal of fission products. For this purpose phthalocyanine is reacted with the isolated fission product compounds, whereby stable phthalocyanine complexes are formed with the rare earths and the fission products are immobilized. The insoluble rare earth phthalocyanines are relatively nonbulky and can be disposed as such underground.

The alkali metal and alkaline earth metal phthalocyanines, on account of their deep color, lend themselves very well for dyeing cloth fabrics. Organic solutions of these alkali metal or alkaline earth metal compounds, either of the deep-blue phthalocyanine or of the green chlorinated phthalocyanine, are applied to the cloth to be dyed, and the material so treated is then boiled in water or dilute acid. By this, the water-insoluble phthalocyanine forms and deposits within the fiber. It was found that the dyes thus formed are especially colorfast and do not fade even when boiled in a strong bleaching solution.

Finally, the heavy metal phthalocyanines are also suited for combined light microscopy-electron miscroscopy examination. The heavy metal in the compound reflects the electrons well, and the color of the compound facilitates recognition under the light microscope.

What is claimed is:

1. A process of preparing heavy-metal phthalocyanines comprising mixing at room temperature an inorganic heavy-metal salt selected from the group consisting of uranyl chloride, uranyl nitrate, lead chloride, lead nitrate, thorium chloride, thorium nitrate, lanthanum chloride, lanthanum nitrate, neodymium chloride, neodymium nitrate, gadolinium chloride, gadolinium nitrate, dysprosium chloride, dysprosium nitrate, samarium chloride, samarium nitrate, holmium chloride, holmium nitrate, erbium chloride, erbium nitrate, europium chloride, europium nitrate, thulium chloride, thulium nitrate, lutetium chloride, lutetium nitrate, ytterbium chloride, ytterbium nitrate, hafnium chloride and hafnium nitrate with a liquid Lewis-base-type organic compound selected from the group consisting of dimethyl formamide and methyl sulfoxide, whereby a water-free complex is formed between heavy-metal salt and the organic compound; separating said complex from the organic solution; mixing the complex at room temperature in the absence of water with a metal phthalocyanine wherein said metal is selected from the group consisting of sodium, potassium, lithium, magnesium and beryllium, one mole of metal phthalocyanine being used per one mole of said complex, whereby heavy-metal phthalocyanine is obtained in crystalline form; and separating said crystals formed from the solution.

2. The process of claim 1 wherein said inorganic heavy-metal salt is added in a quantity sufficient to saturate said organic liquid.

3. The process of claim 2 wherein the heavy-metal salt is the uranyl nitrate hexahydrate.

4. The process of claim 2 wherein the heavy-metal salt is the uranyl chloride.

5. The process of claim 2 wherein the Lewis-base-type organic compound is dimethyl formamide.

6. The process of claim 2 wherein the Lewis-base-type organic compound is dimethyl sulfoxide.

7. The process of claim 2 wherein the metal phthalocyanine mixed with the complex is lithium phthalocyanine.

8. A process of preparing uranyl phthalocyanine comprising saturating boiling anhydrous dimethyl formamide with uranyl nitrate hexahydrate; cooling the reaction mixture obtained to about 0° C. whereby a complex forms and precipitates as yellow crystals; removing said crystals from the liquid; washing said crystals in anhydrous diethyl ether; drying said crystals at about 200° C.; dissolving said crystals in anhydrous dimethyl formamide; stirring the solution of said crystals slowly into a solution of lithium phthalocyanine in anhydrous dimethyl formamide at room temperature whereby a heavy deep-blue precipitate forms; separating said precipitate from the solution; washing the precipitate first with dimethyl formamide and then with diethyl ether; and drying the precipitate of uranyl phthalocyanine.

9. A process of preparing heavy-metal sulfonated phthalocyanine comprising boiling a mixture of sulfonated phthalocyanine and an inorangic water-soluble heavy-metal salt in water, said heavy-metal salt selected from the group consisting of uranyl chloride, uranyl nitrate, lead chloride, lead nitrate, thorium chloride, thorium nitrate, lanthanum chloride, lanthanum nitrate, neodymium chloride, neodymium nitrate, gadolinium chloride, gadolinium nitrate, dyspropsium chloride, dysprosium nitrate, samarium chloride, samarium nitrate, holmium chloride, holmium nitrate, erbium chloride, erbium nitrate, europium chloride, europium nitrate, thulium chloride, thulium nitrate, lutetium chloride, lutetium nitrate, ytterbium chloride, ytterbium nitrate, hafnium chloride and hafnium nitrate being used in an amount considerably above the stoichiometric amount required, whereby a water-insoluble heavy-metal sulfonated phthalocyanine complex precipitates in which heavy-metal ions are bonded to the two available nitrogens in the center position while other ions of the same heavy metal are bonded to sulfo groups; separating the metal complex formed from the solution; and replacing the metal ion in the sulfo groups by a monovalent cation.

10. The process of claim 9 wherein the heavy metal salt is uranyl chloride.

11. The process of claim 9 wherein the heavy-metal salt is nitrate uranyl salt.

12. The process of claim 11 wherein tetrasulfonated phthalocyanine is used and uranyl salt is added in a quantity of at least three moles per one mole of the tetrasulfonated phthalocyanine.

13. The process of claim 11 wherein the uranyl sulfonated phthalocyanine precipitate is reacted with hydrogen sulfide to replace the sulfo-bonded uranyl groups by hydrogen.

14. The process of claim 11 wherein the uranyl sulfonated phthalocyanine precipitate is reacted with sodium hydroxide to replace the sulfo-bonded uranyl groups by sodium.

15. The process of claim 11 wherein the uranyl sulfonated phthalocyanine precipitate is reacted with potassium hydroxide to replace the sulfo-bonded uranyl groups by potassium.

16. The process of claim 11 wherein the water-insoluble uranyl sulfonated phthalocyanine is dissolved and the solution formed thereby is contacted with an anion exchange resin in its sodium form whereby the sulfo-bonded uranyl groups are replaced by sodium ions.

17. The process of claim 16 wherein the water-insoluble uranyl sulfonated phthalocyanine is dissolved in ammonia.

18. The process of claim 16 wherein the water insoluble uranyl sulfonated phthalocyanine is dissolved in hydrochloric acid.

19. A process of preparing uranyl sulfonated phthalocyanine comprising dissolving sulfonated phthalocyanine in boiling water; adding uranyl sulfate; refluxing the mixture thus obtained for several hours whereby a precipitate forms; removing said precipitate from the supernatant; suspending the precipitate in water; passing hydrogen sulfide through the suspension formed; refluxing the suspension, whereby a black precipitate forms; removing the black precipitate from a deep-blue solution; and evaporating said deep-blue solution to dryness whereby uranyl sulfonated phthalocyanine is obtained.

20. A proecss of preparing the ammonium salt of uranyl sulfonated phthalocyanine comprising mixing uranyl sulfate with dimethyl formamide whereby a water-free complex is formed between the uranyl sulfate and the dimethyl formamide; adding said complex to a solution of tetrachlorosulfonyl-substituted phthalocyanine in dimethyl formamide; refluxing the mixture thus obtained for several hours; cooling the mixture to about 0° C. whereby deep-blue crystals of tetrachlorosulfonyl-substituted uranyl phthalocyanine precipitate; washing the crystals with water; refluxing the crystals in an aqueous solution of ammonia whereby the ammonium salt of uranyl tetrasulfonated phthalocyanine is obtained.

21. Heavy-metal phthalocyanine selected from the group consisting of uranyl chloride, uranyl nitrate, lead chloride, lead nitrate, thorium chloride, thorium nitrate, lanthanum chloride, lanthanum nitrate, neodymium chloride, neodymium nitrate, gadolinium chloride, gadolinium nitrate, dysprosium chloride, dysprosium nitrate, samarium chloride, samarium nitrate, holmium chloride, holmium nitrate, erbium chloride, erbium nitrate, europium chloride, europium nitrate, thulium chloride, thulium nitrate, lutetium chloride, lutetium nitrate, ytterbium chloride, ytterbium nitrate, hafnium chloride and hafnium nitrate in which the heavy-metal ion is bonded to the two available center nitrogen atoms.

22. Gadolinium phthalocyanine in which the gadolinium is bonded to the two available center nitrogen atoms.

23. Lanthanum phthalocyanine in which the lanthanum is bonded to the two available center nitrogen atoms.

24. Neodymium phthalocyanine in which the neodymium is bonded to the two available center nitrogen atoms.

25. Thorium phthalocyanine in which the thorium is bonded to the two available center nitrogen atoms.

26. Monouranyl phthalocyanine in which the uranyl ion is bonded by the two available center nitrogen atoms.

27. Heavy-metal sulfonated phthalocyanine selected from the group consisting of uranyl chloride, uranyl nitrate, lead chloride, lead nitrate, thorium chloride, thorium nitrate, lanthanum chloride, lanthanum nitrate, neodymium chloride, neodymium nitrate, gadolinium chloride, gadolinium nitrate, dysprosium chloride, dysprosium nitrate, samarium chloride, samarium nitrate, holmium chloride holmium nitrate, erbium chloride, erbium nitrate, europium chloride, europium nitrate, thulium chloride, thulium nitrate, lutetium chloride, lutetium nitrate, ytterbium chloride, ytterbium nitrate, hafnium chloride and hafnium nitrate in which the heavy-metal ion is bonded to the two available center nitrogen atoms.

28. Gadolinium sulfonated phthalocyanine in which the gadolinium is bonded to the two available center nitrogen atoms.

29. Lanthanum sulfonated phthalocyanine in which the lanthanum is bonded to the two available center nitrogen atoms.

30. Neodymium sulfonated phthalocyanine in which the neodymium is bonded to the two available center nitrogen atoms.

31. Thorium sulfonated phthalocyanine in which the thorium is bonded to the two available center nitrogen atoms.

32. Monouranyl sulfonated phthalocyanine wherein the uranyl ion is bonded by the two available center nitrogen atoms and the sulfo groups are attached to the benzene rings.

33. The monouranyl sulfonated phthalocyanine of claim 32 wherein a total of four $SO_3H$ groups are attached to the benzene rings.

34. The monouranyl sulfonated phthalocyanine of claim 32 wherein the uranium is uranium$^{233}$.

35. The monouranyl sulfonated phthalocyanine of claim 32 wherein the uranium is uranium$^{235}$.

36. The ammonium salt of tetrasulfonic-substituted uranyl phthalocyanine.

References Cited in the file of this patent

UNITED STATES PATENTS

| | | |
|---|---|---|
| 1,635,113 | Cervi | July 5, 1927 |
| 2,769,776 | Reid | Nov. 6, 1956 |
| 2,859,095 | Manning et al. | Nov. 4, 1958 |
| 2,899,451 | Neville | Aug. 11, 1959 |
| 2,899,452 | Gofman | Aug. 11, 1959 |
| 2,911,338 | Tabern | Nov. 3, 1959 |

OTHER REFERENCES

Lubs: "The Chemistry of Synthetic Dyes and Pigments," pp. 607–624, American Chemical Society Monograph Series No. 127. Reinhold Pub. Co., N.Y., 1955. TP 913L8.

Bases: "Science," vol. 126, pp. 164–5, July 26, 1957.

Bradley: "Recent Progress In the Chemistry of Dyes and Pigments," pp. 39–41, The Royal Institute of Chemistry, Lectures, Monograph and Reports, 1958, No. 5.